Sept. 9, 1969     V. M. BEARD     3,465,956

DOMESTIC CENTRIFUGAL SEPARATOR

Filed July 10, 1967

INVENTOR
VERNA M. BEARD

BY Oberlin, Maky, Donnelly & Renner
ATTORNEYS

United States Patent Office 3,465,956
Patented Sept. 9, 1969

3,465,956
DOMESTIC CENTRIFUGAL SEPARATOR
Verna M. Beard, 436 Hurst Drive,
Bay Village, Ohio 44140
Filed July 10, 1967, Ser. No. 652,239
Int. Cl. B04b 9/00, 1/00, 3/00
U.S. Cl. 233—23            1 Claim

ABSTRACT OF THE DISCLOSURE

A two-part centrifugal separator, with a motor containing base part and a centrifuging vessel part removably supported on the former for drive by the motor through rotary couplers. The vessel includes a separable collector cup at the center interior which receives the fat separated by being forced inwardly to the center when the vessel rotates at centrifuging speed. The inner surfaces of the vessel and the cup surfaces are preferably made of plastic or coated with a nonstick finish for easy cleaning.

---

This invention relates to separators and has as a primary object the provision of a centrifugal separator particularly suited for removal of fat in the domestic preparation of various foods.

It has been appreciated for many years that persons afflicted with or susceptible to certain circulatory diseases such as atherosclerosis and cardiovascular disease should observe dietary restrictions especially with respect to the consumption of fat and cholesterol. The latter is most often found associated with animal fat and, with medical research having established that cholesterol pathologically deposited on the walls of the blood vessels can lead to hardening of the arteries and heart disease, special diets low in cholesterol and fat have been developed for such persons in particular. Such a planned diet entails not only the proper selection of foods and the amounts thereof, but in a number of instances also special methods of preparation and the extraction or removal of fat receives special attention in this last regard.

As an example, one text on the subject recommends the removal of fat from soup and soup stock by chilling for a sufficient time for the fat to cake on top; with jelled stock, the fat cake is to be carefully removed from the top and remaining fat wiped from the jelly and bowl with a damp cloth, and, with unjelled stock or soup, the major part of the fat is spooned off and the remainder taken up with absorbent paper. Commercially prepared creamed soups containing fat are excluded in this particular plan on the ground that it is difficult to remove fat from them. The same authority also contains instructions for extracting melted fat from meat drippings in preparing gravy, with chilling again recommended for the purpose.

The centrifugal separator provided by the present invention eliminates these manual and slow methods of fat extraction and, furthermore, can be used to reduce or totally eliminate fat from all such foods including those which the housewife has not previously been able to process.

It is a further object of the invention to provide such a domestic separator which is inexpensive to produce and of a design which makes it very easy to use and to clean.

It is an additional object of the present improvements to provide a centrifugal separator having a separable powered drive unit which can be used to power other accessory devices such as blenders and the like.

Other objects and advantages of the present invention will become apparent as the following description proceeds.

To the accomplishment of the foregoing and related ends the invention, then, comprises the features hereinafter fully described and particularly pointed out in the claim, the following description and the annexed drawing setting forth in detail a certain illustrative embodiment of the invention, this being indicative, however, of but one of the various ways in which the principle of the invention may be employed.

Figure 1:
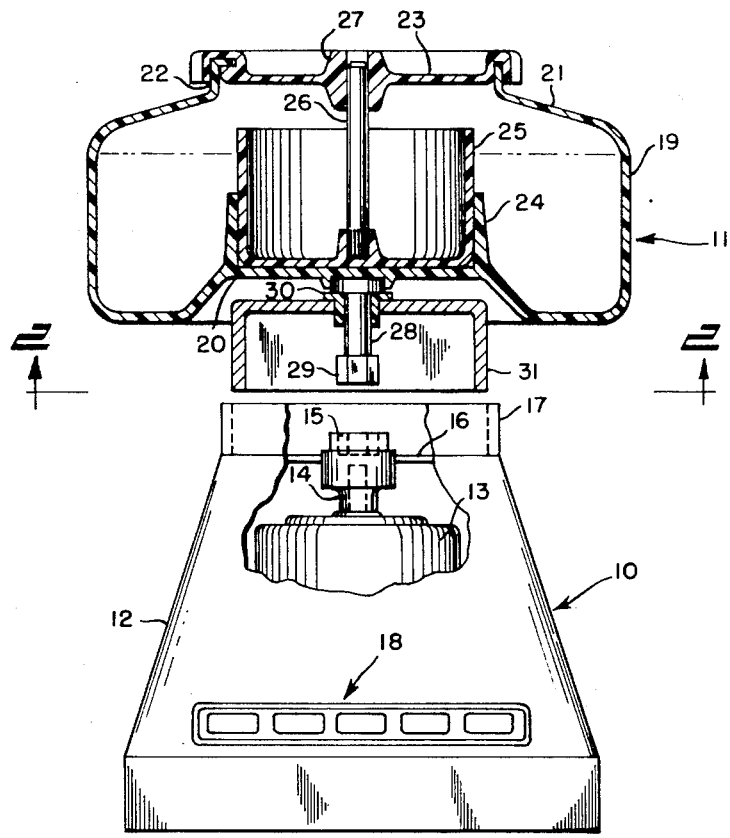
Figure 2:
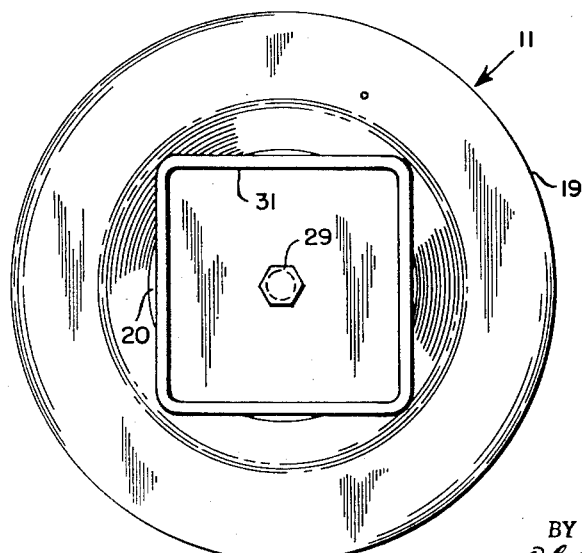

In said annexed drawing:

FIG. 1 shows a centrifugal separator in accordance with the invention partly in section and partly in elevation; and FIG. 2 is a bottom plan view of the upper part of the separator at the plane of the line 2—2 in FIG. 1.

With reference now to the drawing in detail, the new separator is basically of two-part construction, with one a power unit designated generally by reference numeral 10 and the other a centrifugal extractor designated generally by reference numeral 11.

The power unit 10 serves as a base and has a housing 12 of truncated pyramidal shape. An electric motor 13 is mounted in this housing with its output shaft 14 vertical and connected to a female shaft coupling 15 projecting to some extent as shown above the top 16 of the main portion of the housing. This top is enclosed by a flange 17 about the edges of the square top and projecting higher than the coupling 15. The motor is preferably of variable speed type, with a pushbutton control 18 for selection of the desired speed as is known in conventional blender construction.

The extractor unit 11 comprises a casing or vessel 19 which is generally cylindrical and has a closed recessed bottom 20. The top 21 of the casing is a conical continuation of the side wall and has a centered circular opening at which there is a flange or collar 22. The latter is formed to receive a cover 23 shown as having a bayonet engagement therewith.

The casing 19 is also formed with a cylindrical inner wall or sleeve 24 which is concentric and projects upwardly about the depressed portion of the bottom 20. A cylindrical cup 25 is loosely received within the sleeve and has a stem 26 extending from an interior attachment at the bottom center of the cup upwardly through an apertured guide section 27 provided at the center of the cover. The cup 25 is thus free to move vertically in the casing and to rise with the cover in place the illustrated distance between the top of the cup and the cover until the former engages the latter. Such movement is guided and stabilized cooperably by the casing sleeve 24 about the lower part of the cup at rest and the movement of the stem 26 in the cover guide 27. It will also be appreciated that with the cover removed, the cup can be withdrawn from the casing very conveniently by lifting the stem, so that the latter also serves in this sense as a handle for the cup.

A stub shaft 28 is affixed to the bottom 20 of the casing and extends downwardly on the axis, with a male coupling 29 at the end drivingly to engage the female coupling 15 of the power unit. The shaft is supported in a combination thrust and journal bearing 30, which may for example be made of nylon or powdered metal, held in a mount 31 of inverted shallow box form and open at the bottom. This mount is slightly smaller in size than the top flange 17 of the power unit, so that the former can be fitted fairly closely within the latter to rest on the base top 16, and this interfit brings the couplings 15, 29 into driving engagement.

It will be noted that the extractor unit mount 31 is of sufficient depth that the coupling 29 is above the plane of the bottom edges of the mount, whereby this mount can serve as a base to hold the extractor unit 11 upright when detached and set, for example, on a counter surface.

With the two parts 10, 11 coupled and the motor energized, the extractor will of course rotate at the slected speed, which will be sufficient to cause centrifugal extraction or separation of fat from liquids such as the aforementioned soup stock and meat drippings. The housewife or other operator will place the drippings for example in the casing 19, with the cup 25 in place and about the latter, the dashed line indicating an illustrative level of the liquid without rotation. The cover 23 is applied to close the casing fully and the motor then turned on to rotate the casing. The particles of fat in the liquid, being lighter, are forced inwardly by the centrifugal action and to the surface above the top of the cup 25. The latter will rise with filling of the vessel and descend to the rest position as the liquid is displaced outwardly against the wall by the centrifugal action which brings the fat to the center as noted. When the vessel is stopped, the cup rises and traps the fat therein. If desired, the vessel cover can be made transparent so that the separation can be observed and, when completed, the cover is removed and the cup lifted by the stem from the vessel.

The casing, cup and cover are preferably formed of plastic, not only because of the ease with which they can be produced from such material, but to enhance cleanability of the assembly. In this last regard, if it is desired to make some or all of these components of metal, their interior surfaces in exposure to the liquid should preferably be coated with a nonstick finish, such as polytetrafluoroethylene or silicone resin, for comparable ease of cleaning.

The advantages afforded the housewife by this new extractor are obvious from the foregoing, and it is equally clear that the permitted separation of the extractor unit from the power unit facilitates the handling, storage, use and cleaning of the former and also permits the latter to alternatively drive other accessories such as a conventional blender jar.

Other modes of applying the principle of the invention may be employed, change being made as regards the details described, provided the features stated in any of the following claims or the equivalent of such be employed.

I, therefore, particularly point out and distinctly claim as my invention:

1. A domestic separator for extracting fat from foods such as soups and meat drippings, comprising a portable free-standing base unit including a housing, a centrifugal extractor unit on said base unit, electric motor drive means in the base unit for rotating the extractor unit at centrifuging speed, said base and extractor units being separable and carrying separable rotary coupling means as part of the motor drive means, the extractor unit including a generally cylindrical vessel open at the top and having a cover removably applied to close the same, and a separate cylindrical container concentric within said vessel, said container having a generally flat bottom and being open at the top, the vessel being formed interiorly with a central seat part including an upstanding cylindrical flange within which the container is removably nested, said flange extending upwardly along the outer wall of said container approximately one half the vertical dimension of said outer wall, said flange serving to guide and confine the upward vertical movement of said container during the filling of said vessel and the downward vertical movement of said container during the centrifuging operation, said container being provided with handle means for withdrawal of the same through the open top of the vessel, and the extractor unit further including bottom mounting means for supporting the same separate from said base unit and for nonrotatably engaging the housing of the latter when the extractor and base units are united.

References Cited
UNITED STATES PATENTS

| | | | |
|---|---|---|---|
| 1,296,399 | 3/1919 | Johansson | 233—27 |
| 3,185,304 | 5/1965 | Bradley | 233—23 X |

WILLIAM I. PRICE, Primary Examiner

U.S. Cl. X.R.

233—27